(12) United States Patent
Mair

(10) Patent No.: US 10,118,622 B2
(45) Date of Patent: Nov. 6, 2018

(54) METHOD FOR CONTROL OF A GEAR STEP CHANGE

(71) Applicant: ZF Friedrichshafen AG, Friedrichshafen (DE)

(72) Inventor: Roland Mair, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 119 days.

(21) Appl. No.: 15/297,357

(22) Filed: Oct. 19, 2016

(65) Prior Publication Data

US 2017/0120921 A1 May 4, 2017

(30) Foreign Application Priority Data

Oct. 29, 2015 (DE) .......................... 10 2015 221 156

(51) Int. Cl.
*B60W 10/18* (2012.01)
*B60W 30/18* (2012.01)
(Continued)

(52) U.S. Cl.
CPC ...... *B60W 30/18136* (2013.01); *B60W 10/02* (2013.01); *B60W 10/06* (2013.01);
(Continued)

(58) Field of Classification Search
None
See application file for complete search history.

(56) References Cited

U.S. PATENT DOCUMENTS

| 5,855,534 | A | | 1/1999 | Bates |
| 6,126,251 | A | * | 10/2000 | Yoshii ...................... B60L 7/26 |
| | | | | 303/152 |

(Continued)

FOREIGN PATENT DOCUMENTS

| DE | 102 16 546 A1 | 10/2002 |
| DE | 696 22 680 T2 | 4/2003 |

(Continued)

OTHER PUBLICATIONS

German Search Report Corresponding to 10 2015 221 156.8 dated Aug. 16, 2016.

*Primary Examiner* — Justin Holmes
(74) *Attorney, Agent, or Firm* — Davis & Bujold PLLC; Michael J. Bujold

(57) ABSTRACT

A motor vehicle having a braking device and drive engine which can be used independently of one another for decelerating the vehicle. A method of controlling the vehicle during a thrust operation includes steps of detecting a requirement to change a currently engaged first gear in a transmission that transfers the braking force from the engine; determining a first deceleration brought about by the engine in the first gear; determining a second deceleration brought about by the engine in a second gear to be engaged; and changing the gear by disengaging a clutch that couples the engine to the transmission, the first gear is disengaged, the second gear is engaged, and the clutch is again engaged. In this case, the braking device is controlled, during the gear change, in such manner that any jerk experienced by the vehicle is below a predetermined value.

6 Claims, 3 Drawing Sheets

(51) Int. Cl.
  *B60W 10/02* (2006.01)
  *B60W 10/11* (2012.01)
  *B60W 10/196* (2012.01)
  *B60W 50/00* (2006.01)
  *B60W 10/06* (2006.01)
  *B60W 30/19* (2012.01)

(52) U.S. Cl.
  CPC ............ *B60W 10/11* (2013.01); *B60W 10/18* (2013.01); *B60W 10/196* (2013.01); *B60W 30/18072* (2013.01); *B60W 30/19* (2013.01); *B60W 50/0097* (2013.01); *B60W 2030/18081* (2013.01); *B60W 2510/0652* (2013.01); *B60W 2510/1005* (2013.01); *B60W 2710/021* (2013.01); *B60W 2710/1005* (2013.01); *B60W 2720/10* (2013.01)

(56) References Cited

U.S. PATENT DOCUMENTS

| | | | |
|---|---|---|---|
| 7,123,998 B2 | 10/2006 | Bates et al. | |
| 2001/0016795 A1* | 8/2001 | Bellinger | B60W 10/06 701/53 |
| 2004/0014565 A1* | 1/2004 | Oshima | B60W 10/06 477/182 |
| 2004/0209733 A1* | 10/2004 | Bates | B60T 1/06 477/71 |
| 2006/0173599 A1* | 8/2006 | Landes | B60W 10/11 701/50 |
| 2008/0125946 A1* | 5/2008 | Fakler | F16H 61/0213 701/62 |
| 2012/0101699 A1* | 4/2012 | Boissinot | B60W 10/06 701/54 |
| 2014/0066251 A1* | 3/2014 | Kawamoto | B60W 20/30 477/4 |
| 2015/0038296 A1* | 2/2015 | Toyota | B60W 20/00 477/92 |
| 2015/0274154 A1* | 10/2015 | Tsuda | F16H 61/16 701/22 |

FOREIGN PATENT DOCUMENTS

| | | |
|---|---|---|
| DE | 10 2004 002 347 A1 | 7/2004 |
| DE | 103 62 004 A1 | 12/2004 |
| WO | 2006/119850 A1 | 11/2006 |

* cited by examiner

METHOD FOR CONTROL OF A GEAR STEP CHANGE

This application claims priority from German patent application serial no. 10 2015 221 156.8 filed Oct. 29, 2015.

FIELD OF THE INVENTION

The invention concerns a motor vehicle with a drive-train having a change-speed transmission. In particular, the invention concerns the control of the change of a gear step currently engaged in the transmission during thrust-mode operation of the motor vehicle.

BACKGROUND OF THE INVENTION

A motor vehicle comprises a drive-train with a drive engine, a clutch, a transmission and a drive wheel. In the transmission various gear steps can be engaged. The gear steps give rise to different step-down ratios between the rotational speed of a drive engine and that of a drive wheel when the clutch is closed. During thrust operation, for example when driving downhill, the motor vehicle is decelerated by means of the drive engine. If the transmission is not designed to operate without traction force interruption, then in order to change the gear step currently engaged the drive-train has to be temporarily disconnected by means of the clutch, and the drive engine cannot then exert any braking force on the motor vehicle. When the clutch is closed a jerk of the motor vehicle can occur, which is unpleasant for a person on board or may cause damage to cargo. Moreover, a component in the drive-train may be affected by more severe wear due to the jerking.

DE 102 16 546 A1 concerns a motor vehicle which can be slowed by an engine braking force. It is proposed to compensate the change of the engine braking force as much as possible during a gear step change of a transmission, by activating another braking device in order to maintain the speed of the motor vehicle.

DE 103 62 004 A1 concerns a similar technique, wherein the braking device is in particular controlled in such manner that a transition between braking forces of different strengths before and after the gear step change takes place in a predetermined manner.

SUMMARY OF THE INVENTION

The purpose of the present invention is to indicate a method for the improvement of gear step changes. The invention solves that problem by virtue of the objects of the independent claims. The subordinate claims describe preferred embodiments.

A motor vehicle comprises a braking device and a drive engine which can be used independently of one another to decelerate the motor vehicle. A method for controlling the motor vehicle during thrust operation comprises steps in which a requirement is detected to change a gear step currently engaged in a transmission which transmits the braking force of the drive engine; a first deceleration is determined, which is brought about by the drive engine in a first, currently engaged gear step; a second deceleration is determined, which is brought about by the drive engine in a second gear step that is to be engaged; and the gear step is changed by opening a clutch that couples the drive engine to the transmission, disengaging the first gear step, engaging the second gear step and then closing the clutch. During the gear step change the braking device is controlled in such manner that a jerk undergone by the motor vehicle is below a predetermined threshold value.

By controlling the braking force as a function of the jerk, a harmonious and material-protecting gear step change can be carried out. A passenger on board the motor vehicle can perceive the gear step change as more pleasant. Since the jerk is less severe, the loading and therefore the wear of components of the motor vehicle are reduced.

The braking device can be controlled in such manner that the jerk is virtually eliminated and the deceleration of the motor vehicle is therefore as constant as possible. The deceleration, i.e. the negative acceleration of the motor vehicle, depends on the braking force applied by the braking device. By controlling the gear step change so that there is no jerk, the deceleration of the motor vehicle does not change and thus the speed of the motor vehicle can for example increase or decrease at a constant rate.

Furthermore, the braking device can be controlled in such manner that the deceleration is almost zero so that the speed of the motor vehicle is as constant as possible. Accordingly the gear step change can be carried out under constant conditions, in order for example to redistribute the braking forces between the drive engine and the braking device.

Changing the gear step can also take place slowly. In that way the jerk can be kept below the predetermined threshold value when a relatively large deceleration is associated with the gear step change. The gear step change is usually carried out as quickly as possible, whereby a limit is set on the maximum possible deceleration change for a predetermined maximum jerk. By prolonging the duration of the gear step change, with the same maximum jerk a greater deceleration change is produced. For this, in various embodiments one or more steps of the gear step change can be carried out slowly or one or more pauses can be interposed between the steps.

A computer program product comprises program code means for carrying out the above-described method when the method is carried out on a programmable implementation device or when it is stored on a computer-readable data carrier.

A control device for the above-described motor vehicle comprises a first interface with a clutch for connecting or separating the transmission to or from the drive engine; a second interface with the transmission for controlling the engagement or disengagement of a gear; and a processing device designed to carry out the above-described method.

BRIEF DESCRIPTION OF THE DRAWINGS

The invention will now be described in more detail with reference to the attached figures, which show.

DETAILED DESCRIPTION OF THE PREFERRED EMBODIMENTS

Figure 1:
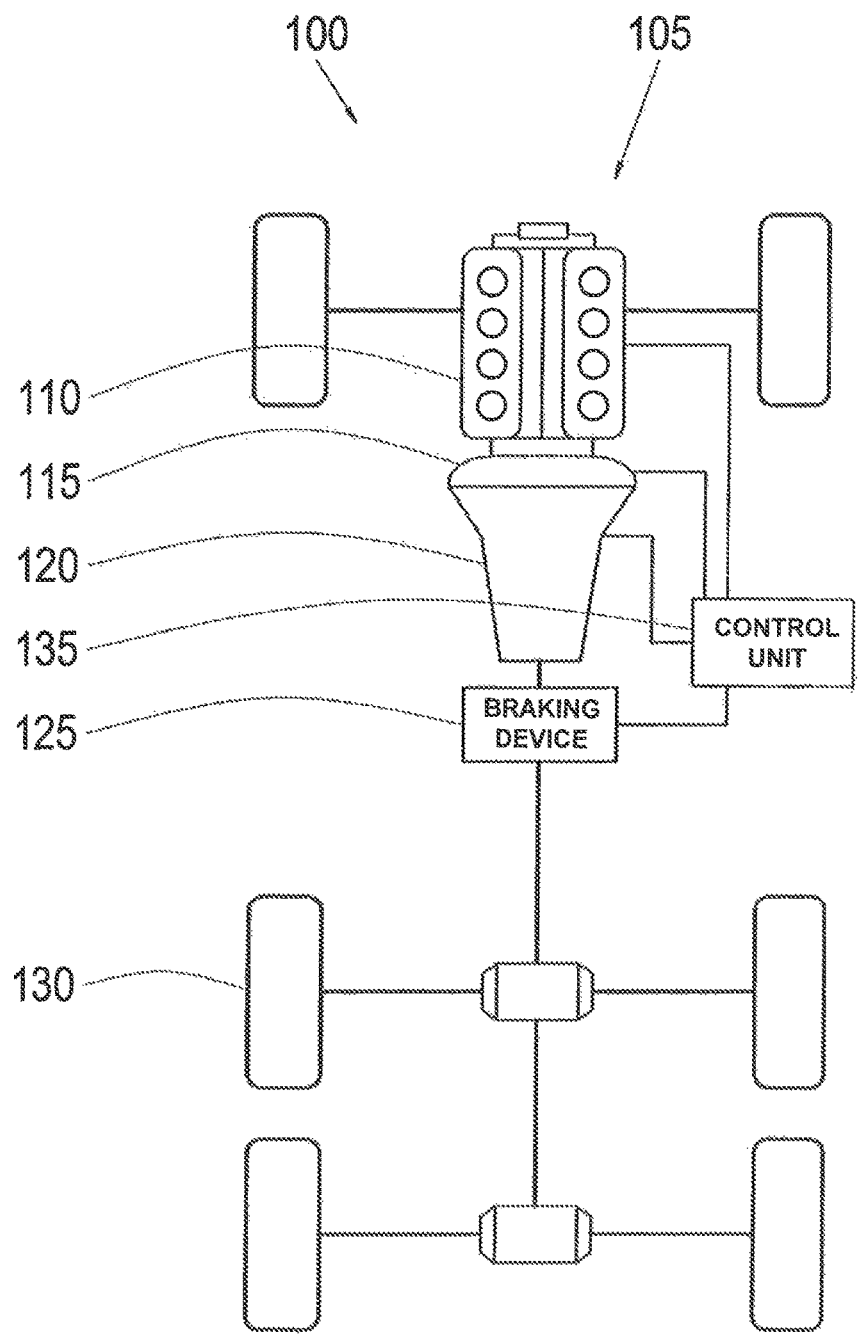
FIG. 1: A schematic representation of a drive-train in a motor vehicle.

FIG. 1 shows a schematic representation of a drive-train 105 arranged in a motor vehicle 100. The motor vehicle 100 can in particular be a utility vehicle or a passenger car. The drive-train 105 comprises a drive engine 110, a clutch 115, a transmission 120, a braking device 125 and a drive wheel 130. Other components too can be comprised in the drive-train 105, for example a cardan shaft and/or a cardan gear system between the transmission 120 and the drive wheel 130. A decelerating or braking force of the drive engine 110 can depend on its rotational speed.

The braking device 125 can be a permanent brake or a service brake or a combination of both, and preferably acts upon the motor vehicle 100 independently of the opening condition of the clutch 115. The drive-train 105 is designed to enable the drive engine 110 to act upon the drive wheel 130 in order to be able to accelerate or decelerate the motor vehicle 100. In the transmission 120 various gear steps can be engaged in order to produce various step-down ratios between the drive engine 110 and the drive wheel 130. The transmission 120 is preferably a transmission that cannot be powershifted, so that in the transmission 120 usually at any one time at most one gear step is engaged. The individual gear steps can be synchronized or unsynchronized. In particular, the transmission 120 can be an AMT transmission (AMT=Automatic Manual Transmission), which in principle can be actuated manually by a driver or automatically by means of one or more actuators.

To control the transmission 120, in particular a control unit 135 can be provided, which acts upon the actuator(s).

The control unit 135 can in addition be connected to the drive engine 110, the clutch 115 or the braking device 125 in order to detect the condition of the respective components 110, 115, 125 so that the values detected can be taken into account for the control of the transmission 120. One of the components 110, 115, 125 can also be actively controlled or influenced by the control unit 135. Thus, in one embodiment a rotational speed of the drive engine 110 can be influenced, the clutch 115 can be opened or closed, or the braking device 125 can be gradually applied or released.

The control unit 135 can be made integrally with the transmission 120. The clutch 115 as well, or the braking device 125 can be integrated with the transmission 120. When it is designed as a permanent brake the braking device 125 preferably comprises a retarder or intarder, which is designed to apply a preferably measurable braking force on the output side of the transmission 120, which is connected to the drive wheel 130 in a torque-transmitting manner. If the braking device 125 is in the form of a service brake, then it can also act directly on one of the wheels of the motor vehicle 100, in particular a drive wheel 130.

During thrust operation, for example when driving downhill, the motor vehicle 100 is at least partially slowed down by a braking force applied by the drive engine 110. However, this braking force is not available when the drive-train 105 is interrupted by means of the clutch 115, for example when a gear step engaged in the transmission 120 is being changed. During the gear step change the braking device 125 can be controlled so that it too applies the braking force of the drive engine 110, for example so that the motor vehicle 100 does not accelerate further. The braking force of the drive engine 110 depends on its rotational speed, which in turn, when the clutch 115 is closed, depends on the gear step engaged. After a downshift the braking force of the drive engine 110 is usually greater than before (because the rotational speed is higher), and after an upshift it is lower than before (because the rotational speed of the engine is lower). Particularly when interrupting or connecting the drive-train 105, when the braking device is activated or deactivated, the motor vehicle can undergo a jerk, which can bring about increased wear on elements of the drive-train 105 or be perceived as unpleasant by a passenger on board the motor vehicle 100.

It is proposed to gauge the braking force applied by the braking device 125 during a gear step change in such manner that a change of the acceleration of the motor vehicle 105, the so-termed jerk, does not exceed a predetermined threshold value. The jerk can act positively or negatively, depending on whether the acceleration of the motor vehicle increases or decreases. Only the positive, only the negative, or both types of jerk can be kept quantitatively below the threshold by appropriately influencing the braking device 125. It is also possible to provide dedicated, equal or different thresholds for the positive and negative jerk.

Figure 2:
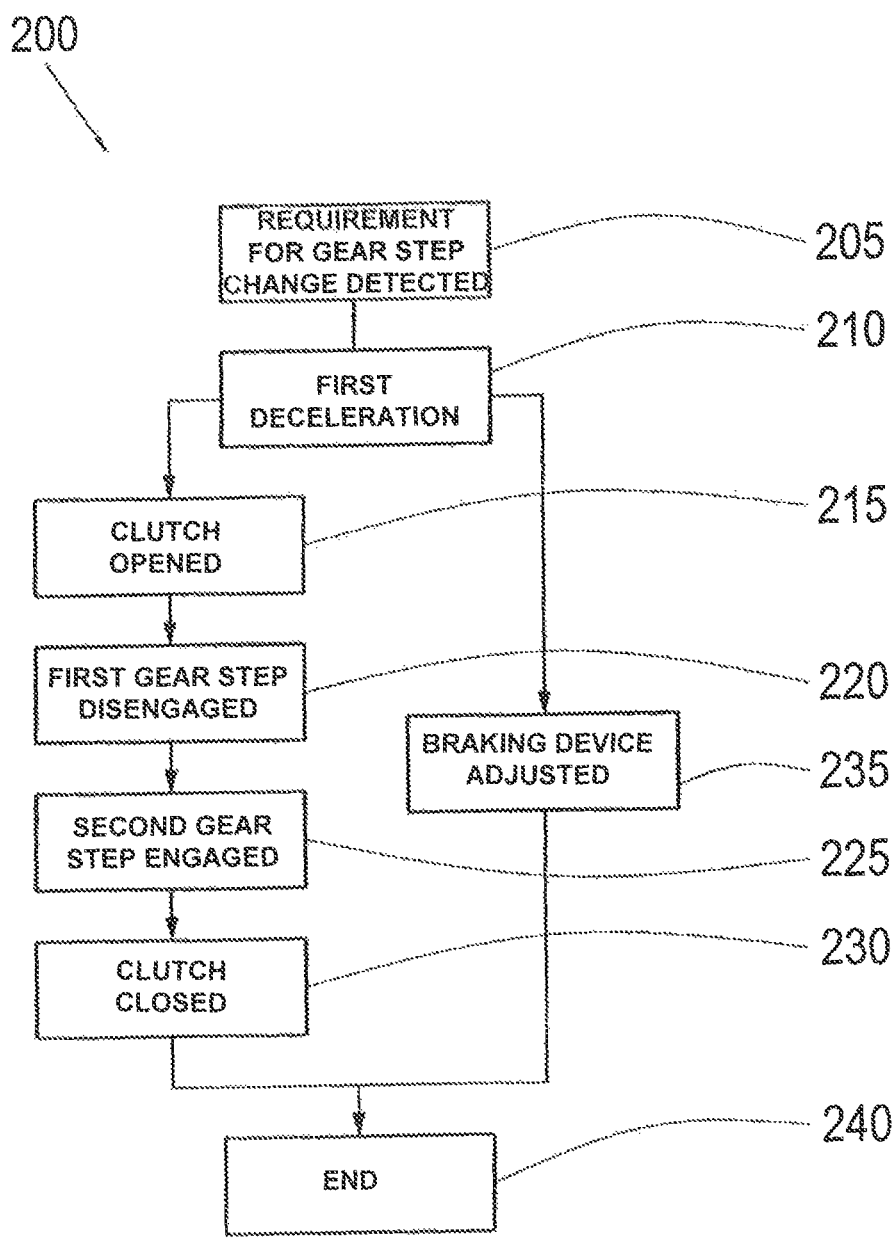
FIG. 2: A flow chart of a method for controlling the motor vehicle of FIG. 1.

FIG. 2 shows a flow chart for a method 200 for controlling a transmission such as the transmission 120 of FIG. 1. The control unit 135 in FIG. 1 is preferably designed to carry out the method 200. For this, it can comprise a programmable microcomputer and the method 200 can be in the form of a computer program product. In one embodiment the method 200 is carried out by only one control unit 135, which controls the drive engine 110, the transmission 120, the clutch 115 and the braking device 125. In other embodiments, for one or more of the components 110, 115 and 125 it is also possible to provide one or more other control units, with which the control unit 135 designed to control the transmission 120 can communicate.

It is assumed that the motor vehicle 100 is in thrust operation, so that the drive engine exerts a braking force on the motor vehicle 100.

In a step 205 a requirement is detected for a gear step change from a first, currently engaged gear step to a second gear step that is to be engaged. Consequently, in a step 210 a first deceleration of the motor vehicle 100 brought about by the drive engine 110 while the first gear step is engaged, and a second deceleration that occurs when the second gear step is engaged, are determined. During this a rotational speed change of the drive engine 110 and a change of the braking force applied by it as a result are preferably taken into account.

Thereafter, in sequence, in a step 215 the clutch 115 is opened, in a step 220 the first gear step is disengaged, in a step 225 the second gear step is engaged and in a step 230 the clutch 115 is closed. In the present case this sequence is called the change of the gear step or also the gear step change. In parallel with the gear step change, in a step 235 the braking device 125 is actuated and the size of the braking force applied by the braking device 125 is controlled in such manner that a harmonic transition between the gear steps takes place. In particular, the braking device is controlled in such manner that that the jerk undergone by the motor vehicle 100 remains quantitatively below a predetermined threshold value. For this, a variation of the actuation of the braking device 125 can be predetermined in step 210 and implemented in step 235, or an adjustment can be made which ensures that the acceleration change of the motor vehicle remains below the threshold value. It is also possible to predetermine a variation and adapt it on the basis of a determination of the jerk.

A gear step change when downshifting the transmission 120 usually lasts for only a predetermined time, during which the transition from a low to a high braking action of the drive engine 110 (or the reverse) cannot take place in some circumstances without giving rise to a more severe jerk than specified. In such a case the gear step change can be prolonged in duration, by carrying out one of the steps 215 to 230 more slowly or by interposing a pause between consecutive steps of the gear step change. In that way the predetermined jerk severity can be maintained, so that even in this case a harmonious gear step change can be carried out In yet another embodiment it can in addition be monitored whether a rotational speed of the input side or of the output side of the transmission 120 is higher than a value specified for a safe engagement of the second gear step. If so, then in particular the braking device 125 can be actuated more firmly or for a longer time, in order to reduce the rotational speed on the output side, or the drive engine 110 can be controlled so as to adapt its rotational speed.

Figure 3:
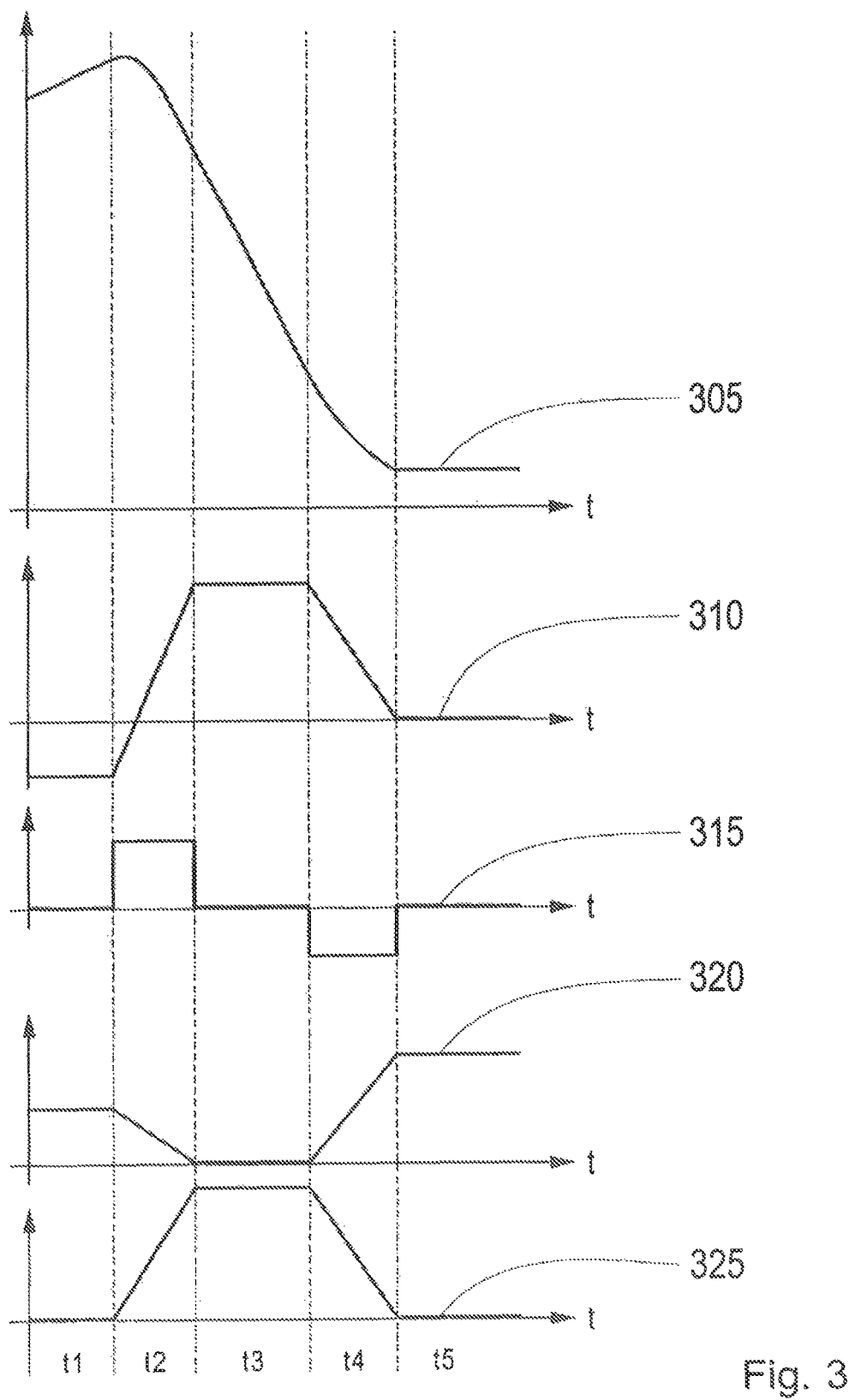
FIG. 3: Graphs of parameters in the motor vehicle of FIG. 1.

FIG. 3 shows graphs of parameters in the motor vehicle of FIG. 1. The time is plotted horizontally. In the vertical direction variations of a number of parameters are shown, which take place parallel with one another in time. A first variation 305 shows the speed of the motor vehicle 100, a second 310 variation shows the total braking force acting on the motor vehicle 100, a third variation 315 shows the jerk that acts on the motor vehicle 100 a fourth variation 320 shows a braking force from the drive engine, and a fifth variation 325 shows the braking force applied by the braking device 125.

The representation is to be understood as qualitative and relates, as an example, to a situation in which the motor vehicle 100 is driving downhill, whereby the motor vehicle, at first in a segment t1, accelerates more rapidly than can be compensated by the braking force of the drive engine 110 alone. Accordingly a downshift gear step change is carried out in order to bring the drive engine 110 to a higher rotational speed so that it can produce a larger braking force.

For this, in a segment t2 the braking device 125 is activated and the clutch 115 is opened, so that the braking force of the drive engine 110 decreases. In parallel with this, the braking force of the braking device 125 is increased in order to compensate for the braking force loss. In the present case the braking device 125 is actuated firmly enough to reduce the speed 305 of the motor vehicle 100. Owing to the change of the total braking force 310 acting, the motor vehicle 100 undergoes a jerk 315, but the braking device 125 is controlled so that the jerk 215 remains quantitatively below a predetermined threshold value.

In the next segment t3 the braking force 310 remains, for example, constant and the speed 305 falls at a constant rate, and during this there is no jerk 315. In this segment the first gear is disengaged and the second gear is engaged.

In a following segment t4 the clutch 115 is closed again, so that the braking force applied by the drive engine 110 increases. At the same time, the force of the braking device 125 is slightly reduced in order to take the increased braking force into account. Preferably, this adjustment is again done in such manner that the jerk 315 produced remains quantitatively below a predetermined threshold value.

In the embodiment described, in a segment t5 the braking action of the drive engine 110 is sufficiently large for the meanwhile reduced speed of the motor vehicle 100 to remain the same when the braking device 125 remains inactivated.

Other situations too can be imagined, in which a gear step change of the transmission 120 can be carried out with assistance from the braking device 125 in such manner that a deceleration of the motor vehicle 100 is changed only so slowly that the jerk produced, or its severity, remains below a predetermined threshold value. In one embodiment the braking device 125 is controlled in such manner that the deceleration is as constant as possible, so that the jerk 315 is as close to zero as possible. In yet another embodiment the deceleration of the motor vehicle is as close to zero as possible so that the speed of the motor vehicle 100 is as constant as possible.

INDEXES

100 Motor vehicle
105 Drive-train
110 Drive engine
115 Clutch
120 Transmission
125 Braking device
130 Drive wheel
135 Control unit
200 Method
205 Requirement for a gear step change
210 Determination of the decelerations
215 Clutch opened
220 First gear step disengaged
225 Second gear step engaged
230 Clutch closed
235 Braking device adjusted
240 End
305 First graph: Speed
310 Second graph: Total braking force acting on the motor vehicle
315 Third graph: Jerk
320 Fourth graph: Braking force from the drive engine
325 Fifth graph: Braking force from the braking device
t1 to t5 Time segments

The invention claimed is:

1. A method of controlling a motor vehicle during a thrust operation, the motor vehicle having a braking device and a drive engine which are independently controllable for decelerating the motor vehicle, the method comprising:
   detecting a requirement to change a gear step engaged in a transmission that transfers braking force from the drive engine;
   determining a first deceleration brought about by the drive engine during a first gear step that is currently engaged;
   determining a second deceleration brought about by the drive engine during a second gear step that is to be engaged;
   changing from the first gear step to the second gear step by disengaging a clutch that couples the drive engine to the transmission, disengaging the first gear step, engaging the second gear step and engaging the clutch;
   controlling the braking device, during the change from the first gear step to the second gear step, such that any jerk experienced by the motor vehicle is below a predetermined threshold value; and
   prolonging a time duration for changing from the first gear step to the second gear step.

2. The method according to claim 1, further comprising controlling the braking device such that the jerk is minimized and deceleration of the motor vehicle is as constant as possible.

3. The method according to claim 2, further comprising controlling the braking device such that the deceleration is minimized so that a speed of the motor vehicle is as constant as possible.

4. The method according to claim 1, further comprising engaging the drive-train at least one of after a delay and after the prolonged time duration.

5. A computer program product with program code means for carrying out a method of controlling a motor vehicle during a thrust operation, the motor vehicle having a braking device and a drive engine which are independently controllable for decelerating the motor vehicle, the method is either carded out by a programmable implementation device or stored on a computer-readable data carder, the method comprising: detecting a requirement to change a gear step engaged in a transmission that transfers a braking force from the drive engine; determining a first deceleration brought about by the drive engine during a first gear step that is currently engaged; determining a second deceleration brought about by the drive engine during a second gear step that is to be engaged; changing from the first gear step to the second gear step by disengaging a clutch that couples the drive engine to the transmission, disengaging the first gear step, engaging the second gear step and engaging the clutch; and controlling the braking device during the change from the first gear step to the second gear step such that any jerk experienced by the motor vehicle is below a predetermined threshold value; and prolonging a time duration for changing from the first gear step to the second gear step.

6. A control unit for a motor vehicle during a thrust operation, such that the motor vehicle comprises a braking device and a drive engine which are independently controllable for decelerating the motor vehicle, such that the control unit comprises:
 a first interface with a clutch for either coupling or decoupling a transmission to or from the drive engine;
 a second interface with the transmission for controlling either engagement or disengagement of a gear step; and
 a processing device for carrying out a method of controlling the motor vehicle during a thrust operation, the method including detecting a requirement to change the gear step engaged in the transmission that transfers braking force from the drive engine; determining a first deceleration brought about by the drive engine during a first gear step that is currently engaged; determining a second deceleration brought about by the drive engine during a second gear step that is to be engaged; changing from the first gear step to the second gear step by disengaging the clutch, that couples the drive engine to the transmission, disengaging the first gear step, engaging the second gear step and engaging the clutch; and controlling the braking device, during the change from the first gear step to the second gear step, such that any jerk experienced by the motor vehicle is below a predetermined threshold value; and prolonging a time duration for changing from the first gear step to the second gear step.

* * * * *